United States Patent
Paturel

(10) Patent No.: US 9,603,489 B2
(45) Date of Patent: Mar. 28, 2017

(54) CUTTING DISC FOR CUTTING FOODSTUFFS AND CORRESPONDING APPLIANCE

(75) Inventor: Bruno Paturel, Aubusson (FR)

(73) Assignee: ELECTROLUX PROFESSIONEL SAS, Senlis (FR)

( * ) Notice: Subject to any disclaimer, the term of this patent is extended or adjusted under 35 U.S.C. 154(b) by 281 days.

(21) Appl. No.: 13/593,640

(22) Filed: Aug. 24, 2012

(65) Prior Publication Data

US 2013/0047809 A1  Feb. 28, 2013

(30) Foreign Application Priority Data

Aug. 25, 2011 (EP) .................................... 11178749

(51) Int. Cl.
  *B26D 1/29* (2006.01)
  *A47J 43/07* (2006.01)
  *A47J 43/25* (2006.01)

(52) U.S. Cl.
  CPC ......... *A47J 43/0722* (2013.01); *A47J 43/255* (2013.01); *B26D 1/29* (2013.01); *Y10T 83/222* (2015.04); *Y10T 83/9372* (2015.04)

(58) Field of Classification Search
  CPC .......... B26D 7/08; B26D 1/14; B26D 1/0006; B26D 1/29; A47J 43/0722; A47J 43/255; B02C 18/20; Y10T 83/9372; Y10T 83/222
  USPC .............. 83/595, 596, 167–168, 932; 30/134
  See application file for complete search history.

(56) References Cited

U.S. PATENT DOCUMENTS

| 3,036,614 | A | * | 5/1962 | Knapp | A47J 43/0722 241/292.1 |
| 3,658,106 | A | * | 4/1972 | Elsasser | 241/291 |
| 4,198,747 | A | * | 4/1980 | LaBounty | E02F 3/965 30/134 |
| 4,277,995 | A | * | 7/1981 | Sontheimer | 241/92 |
| 6,460,444 | B2 | * | 10/2002 | Jacko | 83/865 |
| 8,439,285 | B2 | * | 5/2013 | Beber et al. | 241/92 |

(Continued)

FOREIGN PATENT DOCUMENTS

| BE | 518 318 | 3/1953 | |
| EP | 0 943 278 | 9/1999 | |
| FR | 2565883 | * 6/1984 | ............... B26D 3/22 |

OTHER PUBLICATIONS

Extended European Search Report issued in corresponding European Application No. 11178749.5, dated Oct. 31, 2011.

*Primary Examiner* — Kenneth E. Peterson
*Assistant Examiner* — Nhat Chieu Do
(74) *Attorney, Agent, or Firm* — Banner & Witcoff, Ltd.

(57) ABSTRACT

A cutting disc for cutting foodstuffs, intended for a receptacle of an appliance of the vegetable cutting type, includes: a rotary drive hub, a supporting disc firmly secured to the hub, and at least one blade attached on the supporting disc and extending radially from the hub. The blade comprises a cutting edge with the shape of an "S", the convex portion of the "S" being located on the side of the hub so as to cause the foodstuffs to slide against the cutting edge from a central area of the receptacle towards a middle portion of the cutting edge under the action of the rotation of the supporting disc and of the blade, and the concave portion of the "S" being configured as a sickle in order to cause the foodstuffs to slide against the cutting edge from a peripheral area of the receptacle towards the middle portion.

8 Claims, 2 Drawing Sheets

(56) References Cited

U.S. PATENT DOCUMENTS

| | | | | |
|---|---|---|---|---|
| 8,602,335 B2* | 12/2013 | Krasznai | ........................ | 241/92 |
| 8,677,895 B2* | 3/2014 | Beber et al. | .................... | 99/537 |
| 8,720,325 B2* | 5/2014 | Goncalves et al. | ............. | 99/538 |
| 2010/0154659 A1* | 6/2010 | Conti et al. | ..................... | 99/537 |

* cited by examiner

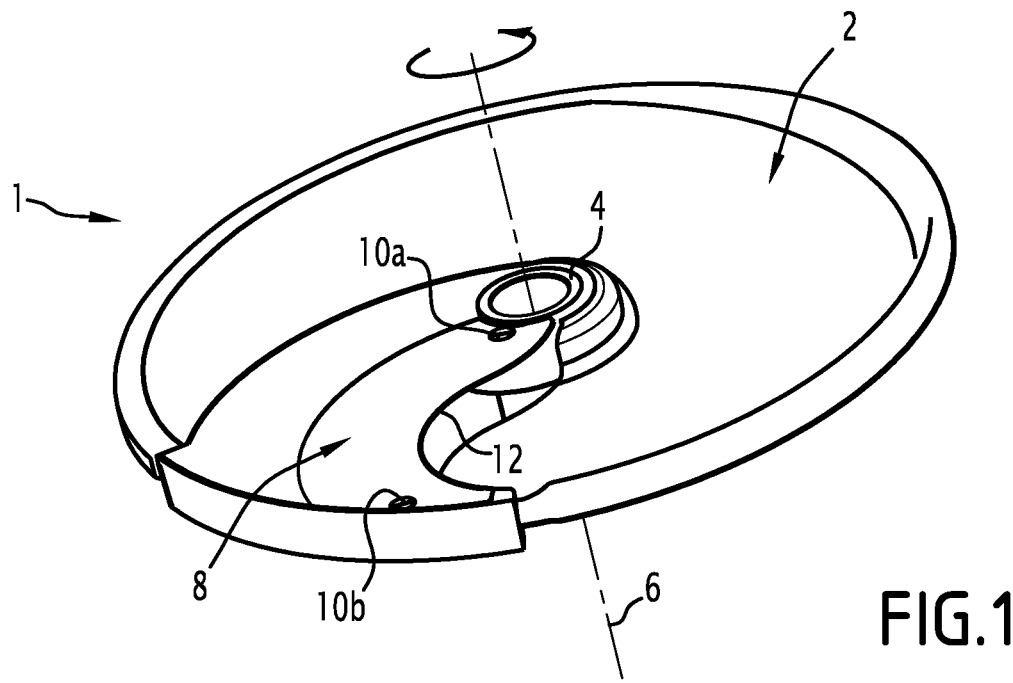
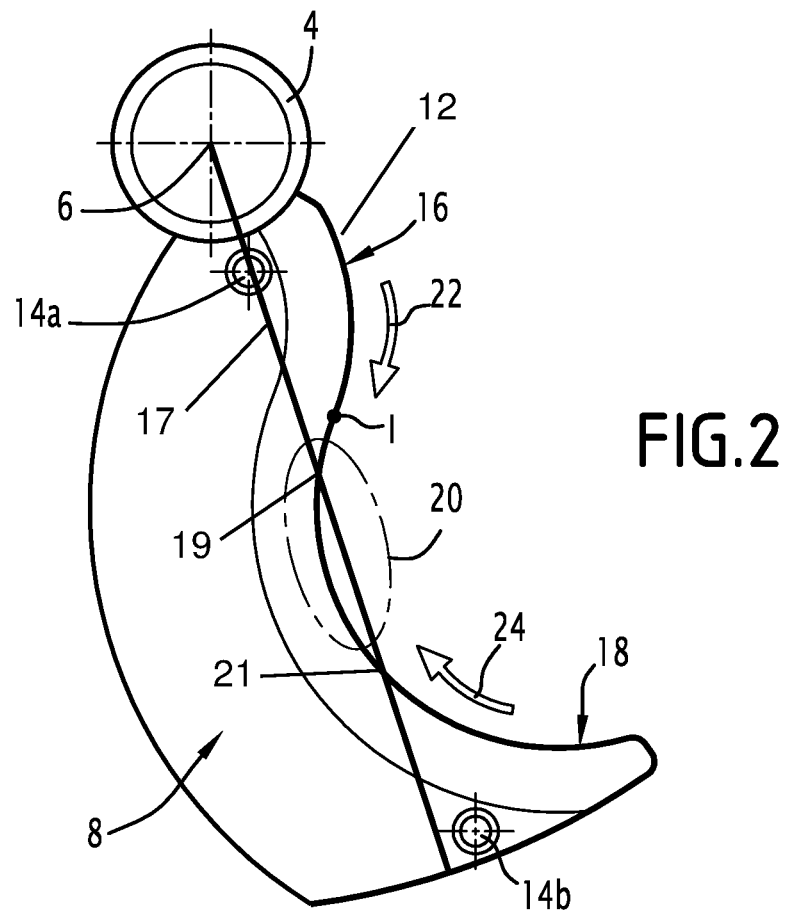
FIG.1
FIG.2

CUTTING DISC FOR CUTTING FOODSTUFFS AND CORRESPONDING APPLIANCE

CROSS-REFERENCE TO RELATED APPLICATION

This application claims priority to European Application No. 11178749.5, filed Aug. 25, 2011, the content of which is hereby incorporated by reference in its entirety.

BACKGROUND OF THE INVENTION

The present invention relates to a cutting disc for cutting foodstuffs, notably intended for a receptacle of an appliance of the vegetable cutting type and to a corresponding appliance.

More particularly, the invention relates to a cutting disc of the type comprising:
- a rotary drive hub,
- a supporting disc firmly secured to the hub, and
- at least one blade attached on the supporting disc and extending radially from the hub.

Appliances of the vegetable cutting type are already known, comprising a receptacle intended to receive the foodstuffs to be cut, the receptacle being equipped with one or more blades attached on a supporting disc driven into rotation by a hub.

The cutting of foodstuffs and in particular of vegetables may take a certain time depending on the nature of the latter and on the desired cutting quality. Further, during the use of the appliance, the foodstuffs sometimes tend to migrate into a peripheral area of the receptacle, against its wall or else in a central area, against the hub. The result of this is possible jamming which limits the capacity and the cutting efficiency of the appliance and extends the time required for the cutting. The result of this is possibly also the production of waste, of so-called "poor cuttings," in a non-negligible amount.

SUMMARY OF SELECTED INVENTIVE ASPECTS

An object of the invention is to solve these problems, i.e. in particular to provide a cutting disc of the aforementioned type, reducing the cutting time for a given amount of foodstuffs and limiting the risk of jamming due to the accumulation of foodstuffs close to the hub or at the periphery of the receptacle.

For this purpose, in an aspect, the invention provides a cutting disc of the aforementioned type, wherein the blade comprises an S-shaped cutting edge, the convex portion of the "S" being located on the side of the hub so as to cause the foodstuffs to slide against the cutting edge from a central area of the receptacle towards a middle portion of the cutting edge under the action of the rotation of the supporting disc and of the blade, and the concave portion of the "S" being configured as a sickle in order to cause the foodstuffs to slide against the cutting edge from a peripheral area of the receptacle towards the middle portion.

According to particular embodiments, the cutting disc may comprise one or more of the following features, taken individually or according to all the technically possible combinations:
- the point where the convex portion and the concave portion of the "S" join together is substantially located at one third the length along the blade;
- the blade includes drill holes for letting through fixing screws on the supporting disc and the hub.

According to another aspect, the invention provides a food preparation appliance of the vegetable cutting type, characterized in that it comprises a cutting disc as described above.

BRIEF DESCRIPTION OF THE DRAWINGS

The invention will be better understood upon reading the description which follows, only given as an example and made with reference to the appended drawings, wherein:

FIG. 1 is a perspective view of a cutting disc according to the invention,

FIG. 2 is a top view of the blade of the cutting disc illustrated in FIG. 1.

DETAILED DESCRIPTION OF EXAMPLE EMBODIMENTS

Figure 3:
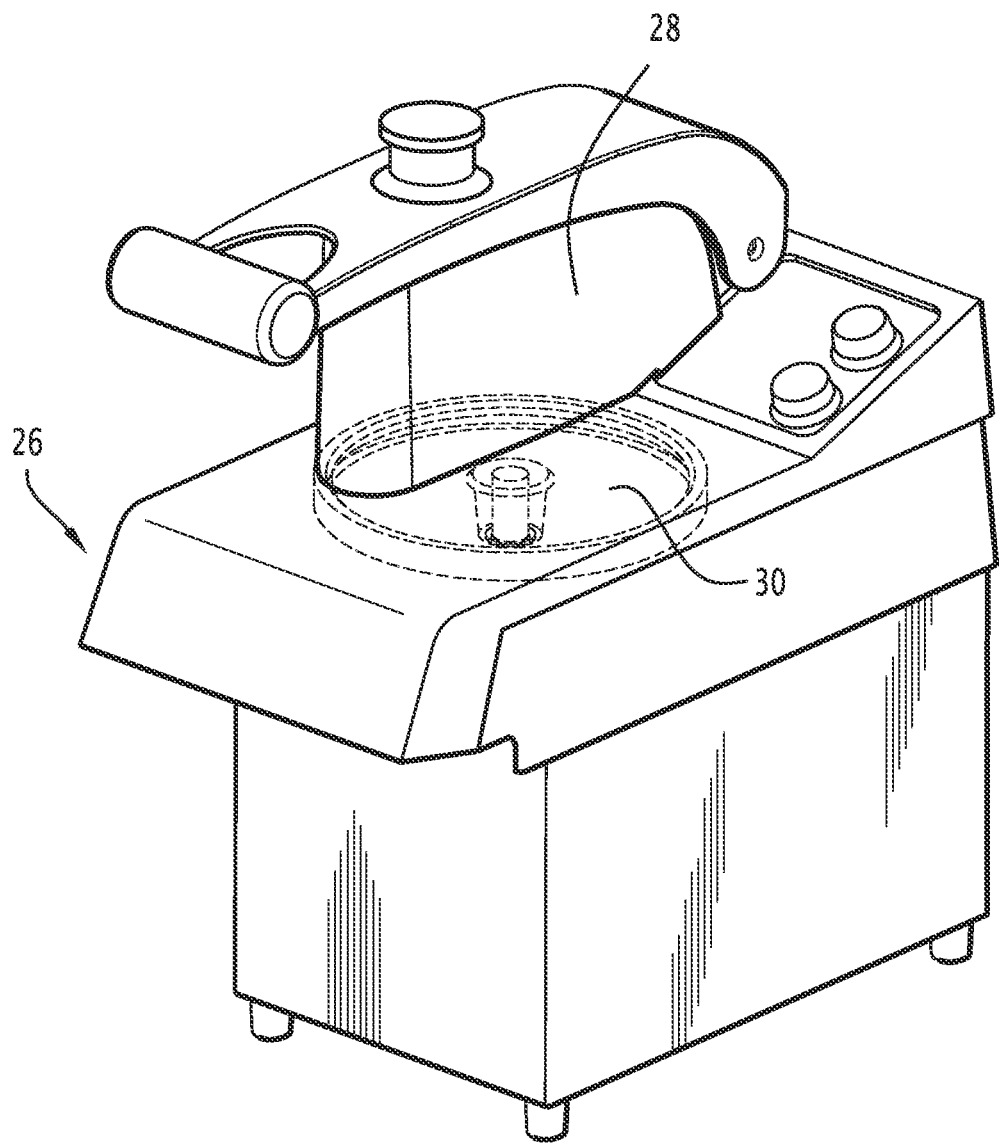
FIG. 3 is a view of a vegetable cutter intended to receive the cutting disc illustrated in FIG. 1.

FIG. 1 shows a cutting disc 1 intended for a food preparation appliance of the vegetable cutting type and comprising a supporting disc 2, a hub 4 for driving into rotation the supporting disc about an axis 6 and at least one blade 8 attached on this supporting disc.

The hub 4 is firmly secured to the supporting disc 2 and is adapted so as to be connected to suitable driving means.

The blade 8 is attached to the supporting disc 2 with a screw 10a on the side of the hub 4 and with a screw 10b on the side of the periphery of the supporting disc 2 at a lumen 2a of the supporting disc through which slices of cut foodstuffs may pass, the remainder of the foodstuff passing above the blade 8. The blade 8 extends radially from the hub 4 and has a cutting edge 12, or cutting leading edge, with the shape of an "S".

The blade 8 will now be described in more detail with reference to FIG. 2.

The blade 8 comprises two drill holes 14a, 14b receiving the screws 10a, 10b for attachment to the supporting disc 2.

The cutting edge 12 of the blade has the shape of an "S". More specifically, the blade 8, which is seen from above, is intended to rotate in the anti-clockwise direction.

This cutting edge comprises in the extension of each other, a convex portion 16 located on the side of the hub 4 and a concave portion 18 with the shape of a sickle, further away from the hub 4 than the convex portion 16. By "convex" is meant bulging in the direction of the rotation and by "concave" is meant recessed. The convex 16 and concave 18 portions join together at a point I which is an inflection point of the "S". A radial line 17 extending from a center of hub 4 to a periphery of disc 2 crosses the S-shaped cutting edge 12 at a first location 19 closer to hub 4 than the periphery and at a second location 21 closer to the periphery than the hub 4.

During the use of the cutting disc, the foodstuffs found in the central area of the receptacle of the appliance slide under the effect of the rotation onto the convex portion 16 of the cutting edge 12 and are directed towards a middle area 20 of the cutting edge 12 along the arrow 22. This sliding effect improves the cutting of the foodstuffs. Further, it moves the foodstuff away from the central area of the receptacle, contributing to reducing the risk of jamming around the hub 4.

Also, the foodstuffs found in the peripheral area of the receptacle, slide, under the effect of the rotation, onto the concave portion 18 of the cutting edge 12 and are directed towards the middle area 20 of the cutting edge 12 along the arrow 24. This sliding effect improves cutting of the foodstuffs and moves them away from the peripheral area of the receptacle, contributing to reducing the risk of jamming at the periphery of the receptacle. By its sickle shape, the concave portion 18 of the cutting edge 12 "catches" the foodstuffs located in the peripheral area of the receptacle.

In the example illustrated in these figures, the inflection point I is found at about one third the length of the cutting edge 12 from the hub 4. The middle area 20 where the foodstuffs converge is located in the concave portion 18. This configuration determines the proportion of concave 16 and convex 18 portions and the general movement of the foodstuffs in the receptacle of the appliance.

Of course other embodiments may be contemplated.

Thus, for example, the cutting disc 1 may include one or more blades 8 as described above and one or more blades of the state of the art not comprising an S-shaped cutting edge.

According to another embodiment, the inflection point I marking the junction between the convex portion 16 and the concave portion 18 of the cutting edge 12 may be located in other locations of the cutting edge 12, for example at the half-way point thereof. In this case, the middle area 20 may be overlapping between the convex portion 16 and the concave portion 18 of the cutting edge 12.

Also, the cutting edge 12 may comprise a substantially rectilinear area between the convex portion 16 and the concave portion 18, i.e. there is no longer in this case any inflection point, and there is no longer a direct passage from the convex portion 16 to the concave portion 18. The "S" then has a central portion formed by this substantially rectilinear area.

The cutting edge may naturally be placed in a food preparation appliance of the vegetable cutting type.

In FIG. 3, a vegetable cutter 26 is illustrated, comprising a hopper 28 for introducing vegetables. The vegetable cutter 26 includes a receptacle 30 intended to receive the cutting disc 1.

It is conceivable that, by the structure described earlier, the cutting disc 1 according to the invention allows reduction in the cutting time by the double sliding effect described above, which improves the efficiency of the blade 8. Further, this double sliding causing the foodstuffs to converge towards the middle area 20, the risk of jamming around the hub 4 or at the periphery of the receptacle is reduced. The amount of waste so-called "poor cuttings" is also reduced.

The invention has been described in terms of particular exemplary embodiments. Numerous other embodiments, modifications and variations within the scope and spirit of the invention as defined in the appended claims will occur to persons of ordinary skill in the art from a review of this disclosure.

The invention claimed is:

1. A cutting disc for cutting foodstuffs, intended for a receptacle of an appliance of the vegetable cutting type, comprising:
   a rotary driving hub,
   a supporting disc firmly secured to the hub, and
   at least one blade attached on the supporting disc and extending radially from the hub,
   wherein the entire at least one blade includes a single S-shaped cutting edge, the cutting edge having a sharpened edge that extends along the entire S-shape, a convex portion of the "S" being located on the side of the hub so as to cause the foodstuffs to slide against the cutting edge from a central area of the receptacle towards a middle portion of the cutting edge under an action of the rotation of the supporting disc and of the blade, and a concave portion of the "S" being configured with the shape of a sickle in order to cause the foodstuffs to slide against the cutting edge from a peripheral area of the receptacle towards the middle portion,
   the convex portion of the S-shape is closer to a center of the rotary driving hub than the concave portion of the S-shape, and
   wherein a radial line extending from a center of the hub to a peripheral tip of the cutting edge of the disc crosses the S-shaped cutting edge at a first location closer to the hub than the peripheral tip and at a second location located at the peripheral tip.

2. The cutting disc according to claim 1, wherein a point where the convex portion and the concave portion of the "S" join together, is located at a point along the blade that is closer to the hub than a midpoint of the blade.

3. A food preparation appliance of the vegetable cutting type, comprising a cutting disc according to claim 2 rotatably mounted within a receptacle thereof.

4. The cutting disc according to claim 2, wherein the blade includes drill holes for passage of fixing screws to secure the blade on the supporting disc and the hub.

5. A food preparation appliance of the vegetable cutting type, comprising a cutting disc according to claim 4 rotatably mounted within a receptacle thereof.

6. The cutting disc according to claim 1, wherein the blade includes drill holes for passage of fixing screws to secure the blade on the supporting disc and the hub.

7. A food preparation appliance of the vegetable cutting type, comprising a cutting disc according to claim 6 rotatably mounted within a receptacle thereof.

8. A food preparation appliance of the vegetable cutting type, comprising a cutting disc according to claim 1 rotatably mounted within a receptacle thereof.

* * * * *